(12) United States Patent
Sugawara et al.

(10) Patent No.: US 9,796,407 B2
(45) Date of Patent: Oct. 24, 2017

(54) STEERING ANGLE DETECTING APPARATUS FOR VEHICLES AND ELECTRIC POWER STEERING APPARATUS EQUIPPED THEREWITH

(71) Applicant: NSK LTD., Tokyo (JP)

(72) Inventors: Takayoshi Sugawara, Tokyo (JP); Ryo Minaki, Tokyo (JP); Hideki Sawada, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/109,566

(22) PCT Filed: Feb. 1, 2016

(86) PCT No.: PCT/JP2016/052957
§ 371 (c)(1),
(2) Date: Jul. 1, 2016

(87) PCT Pub. No.: WO2016/132878
PCT Pub. Date: Aug. 25, 2016

(65) Prior Publication Data
US 2016/0362128 A1    Dec. 15, 2016

(30) Foreign Application Priority Data

Feb. 19, 2015 (JP) .................... 2015-030800

(51) Int. Cl.
*A01B 69/00* (2006.01)
*B62D 6/00* (2006.01)
(Continued)

(52) U.S. Cl.
CPC ............ *B62D 5/046* (2013.01); *B62D 5/04* (2013.01); *B62D 5/0481* (2013.01); *B62D 6/00* (2013.01);
(Continued)

(58) Field of Classification Search
CPC ....... B62D 5/046; B62D 5/0463; B62D 5/049
(Continued)

(56) References Cited

U.S. PATENT DOCUMENTS

2007/0012506 A1   1/2007 Asada
2007/0233345 A1*  10/2007 Endo ............... B62D 5/049
                                                    701/41
(Continued)

FOREIGN PATENT DOCUMENTS

JP    2008-285043 A   11/2008
JP    2009-526214 A    7/2009
(Continued)

OTHER PUBLICATIONS

English Translation for JP2014210472A.*
(Continued)

*Primary Examiner* — Mahmoud Ismail
(74) *Attorney, Agent, or Firm* — Sughrue Mion, PLLC

(57) ABSTRACT

A steering angle detecting apparatus for vehicles includes a vernier calculating section that performs vernier calculation based on a steering shaft angle and a motor angle, a neutral period specifying section that specifies a neutral period including a neutral point based on a reference angle calculated by the vernier calculation in the vernier calculating section, and a neutral point specifying section that specifies the neutral point from the neutral period and a stored neutral point value, and outputs a steering angle the neutral point of which is specified.

13 Claims, 6 Drawing Sheets

(51) Int. Cl.
- *B62D 12/00* (2006.01)
- *B63H 25/04* (2006.01)
- *G05D 1/00* (2006.01)
- *G06F 7/00* (2006.01)
- *G06F 17/00* (2006.01)
- *G06F 19/00* (2011.01)
- *B62D 5/04* (2006.01)
- *G01B 21/22* (2006.01)
- *G01B 7/30* (2006.01)
- *B62D 15/02* (2006.01)

(52) U.S. Cl.
CPC ..... *B62D 15/0215* (2013.01); *B62D 15/0235* (2013.01); *B62D 15/0245* (2013.01); *G01B 7/30* (2013.01); *G01B 21/22* (2013.01)

(58) Field of Classification Search
USPC .............................................. 701/42, 43, 41
See application file for complete search history.

(56) References Cited

U.S. PATENT DOCUMENTS

| | | |
|---|---|---|
| 2008/0148580 A1 | 6/2008 | Maier et al. |
| 2013/0304327 A1* | 11/2013 | Morishita ............ B62D 5/0463 701/43 |

FOREIGN PATENT DOCUMENTS

| | | |
|---|---|---|
| JP | 5181817 B2 | 4/2013 |
| JP | 5195132 B2 | 5/2013 |
| JP | 5401875 B2 | 1/2014 |
| JP | 2014-210472 A | 11/2014 |
| JP | 2014210472 A * | 11/2014 |

OTHER PUBLICATIONS

Written Opinion of PCT/JP2016/052957 dated Apr. 6, 2016.
International Search Report of PCT/JP2016/052957 dated Apr. 6, 2016.

* cited by examiner

PRIOR ART

STEERING ANGLE DETECTING APPARATUS FOR VEHICLES AND ELECTRIC POWER STEERING APPARATUS EQUIPPED THEREWITH

CROSS REFERENCE TO RELATED APPLICATIONS

This application is a National Stage of International Application No. PCT/JP2016/052957 filed Feb. 1, 2016, claiming priority based on Japanese Patent Application No. 2015-030800, filed Feb. 19, 2015, the contents of which are incorporated herein by reference in their entirety.

TECHNICAL FIELD

The present invention relates to a steering angle detecting apparatus for vehicles that obtains a wide range of angle information by performing vernier calculation by means of angle information from an angle sensor provided for a steering shaft and angle information from a rotation angle sensor of a motor, and detects a steering angle the neutral point of which has been specified in a short time by relatively simple processing; and an electric power steering apparatus equipped therewith.

BACKGROUND ART

An electric power steering apparatus which provides a steering mechanism of a vehicle with a steering assist torque by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus (EPS) performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of duty command values of pulse width modulation (PWM) control.

A general configuration of the conventional electric power steering apparatus will be described with reference to FIG. 1. As shown in FIG. 1, a steering shaft (a column shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the steering shaft 2 is provided with a torque sensor 10 for detecting a steering torque of the steering wheel 1, and a motor 20 for assisting a steering force of the steering wheel 1 is connected to the steering shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command on the basis of a steering torque Th detected by the torque sensor 10 and a vehicle speed Vel detected by a vehicle speed sensor 12, and controls a current supplied to the motor 20 on the basis of a voltage control value Vref obtained by performing compensation or the like with respect to the current command value. Moreover, it is also possible to receive the vehicle speed Vel from a controller area network (CAN) or the like.

The control unit 30 mainly comprises a CPU (also including an MCU, an MPU or the like), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 are inputted into a current command value calculating section 31 for calculating a current command value Iref1. The current command value calculating section 31 calculates the current command value Iref1 that is a control target value of a current supplied to the motor 20 on the basis of the inputted steering torque Th and the inputted vehicle speed Vel and by using an assist map or the like. The current command value Iref1 is inputted into a current limiting section 33 through an adding section 32A. A current command value Irefm the maximum current of which is limited is inputted into a subtracting section 32B, and a deviation I (=Irefm−Im) between the current command value Irefm and a motor current value Im being fed back is calculated. The deviation I is inputted into a PI control section 35 for characteristic improvement of steering operations. The voltage control value Vref whose characteristic is improved by the PI control section 35 is inputted into a PWM control section 36. Furthermore, the motor 20 is PWM-driven through an inverter circuit 37 serving as a driving section. The current value Im of the motor 20 is detected by a motor current detector 38 and is fed back to the subtracting section 32B. The inverter circuit 37 uses FETs as driving elements and is comprised of a bridge circuit of FETs.

Further, a compensation signal CM from a compensating section 34 is added in the adding section 32A, and compensation of the system is performed by the addition of the compensation signal CM so as to improve a convergence, an inertia characteristic or the like. The compensating section 34 adds a self-aligning torque (SAT) 343 and an inertia 342 in an adding section 344, further, adds the result of addition performed in the adding section 344 and a convergence 341 in an adding section 345, and then outputs the result of addition performed in the adding section 345 as the compensation signal CM.

Such an electric power steering apparatus has been conventionally equipped with a special steering angle sensor in order to detect a steering wheel angle. Recently, however, there is the case where it is equipped with an angle sensor that can be also made function as a torque sensor by requests such as improvement of reliability, redundancy of functions, and cost reduction.

In general, a steering wheel of a vehicle is designed to rotate from a neutral point to the left and the right by about one and half rounds. In other words, the steering wheel can rotate from a left end to a right end by about three rounds. Therefore, an electric power steering apparatus must be equipped with a steering angle sensor compatible with multi-turn that can detect a wide range of the angle being more than or equal to three rounds in order to appropriately detect the steering wheel angle. Those rounds are equivalent to more than or equal to 1080 degrees (360 degrees×3) as converted into the angle, and it is desirable that the sensor can detect the angle about 1400 degrees in consideration of a margin or the like. In order to respond to this request, an angle sensor incorporating a reduction mechanism or the like has been conventionally constructed, and has been used as a steering angle sensor. However, providing the sensor with the reduction mechanism or the like makes the structure complicated and the cost increase, so that a sensor has been required that makes installation of the steering angle sensor omitted and replaces the steering angle sensor.

On the other hand, an electric power steering apparatus using a brushless DC motor provides a motor shaft with a resolver as a high-precision rotation angle sensor in order to secure commutation accuracy of a motor. However, the resolver detects an angle with high accuracy, while a detectable range of the angle is limited, generally one period of an electric angle, so that the resolver is not suitable to detect a wide range of the angle. Therefore, for example, in the case that a scale factor of reduction performed by a reduction mechanism arranged between a motor and a steering shaft performs is "18.5", and a scale factor depending on the number of pole pairs in the motor is "3", a change in an angel of the steering shaft is detected as a change in an angle of the resolver with a scale factor of 55.5 times in total. That is, in the steering system where the steering wheel rotates from the left end to the right end by three rounds, the resolver angle repeatedly changes in 166.5 periods. This makes it difficult to estimate a steering wheel angle only by the resolver angle, so that there are problems such as that it is necessary to take longer time than a certain degree to perform some estimation. Things like estimation of a neutral point using a steering torque, a wheel speed or the like, estimation from one end to the other end, and estimation of a steering angle by a SAT.

Further, the recent requests such as improvement of reliability, redundancy of functions, and cost reduction have raised the case of equipping the steering shaft with an angle sensor that can also function as a torque sensor. In this case, the angle sensor can detect the angle of the steering shaft in ranges such as a period of 40 degrees and a period of 20 degrees in order to obtain resolution required as a torque sensor. However, even a capacity to detect the angle in the period of 40 degrees does not enable the steering system where the steering wheel rotates from the left end to the right end by three rounds to estimate the steering wheel angle without processing equivalent to in the case of the resolver angle because the angle repeatedly changes in 27 periods.

THE LIST OF PRIOR ART DOCUMENTS

Patent Documents

Patent Document 1: Japanese Patent No. 5401875 B2
Patent Document 2: Japanese Patent No. 5195132 B2
Patent Document 3: Japanese Patent No. 5181817 B2

SUMMARY OF THE INVENTION

Problems to be Solved by the Invention

Such conventional steering angle detecting (or estimating) apparatuses for vehicles as disclosed in the publication of Japanese Patent No. 5401875 B2 (Patent Document 1), the publication of Japanese Patent No. 5195132 B2 (Patent Document 2), and the publication of Japanese Patent No. 5181817 B2 (Patent Document 3) are proposed. The steering angle detecting apparatus for vehicles disclosed in Patent Document 1 estimates an absolute steering angle by a motor angle sensor, stores and calculates the angle in turning right direction ($\theta rmax$) and the angle in returning left direction ($\theta rmin$) respectively, and estimates a steering angle at a middle point. Further, the steering angle estimating apparatus for vehicles disclosed in Patent Document 2 estimates a steering angle by performing calculation by information of a rotation speed with two wheels and information of a SAT.

The steering angle detecting apparatus for vehicles disclosed in Patent Document 3 stores a relative steering angle in an EEPROM, performs calculation by comparing a SAT with the stored value when restoring a power supply, and estimates a steering angle.

The apparatus disclosed in Patent Document 1 can be achieved with a simple structure, but there is a problem that the apparatus cannot always estimate the neutral point because the apparatus cannot estimate it without steering to left and right rack ends. Further, the methods disclosed in Patent Document 2 and Patent Document 3 need to estimate the SAT with as high precision as possible because the precision of estimating the neutral point of the absolute steering angle depends on the precision of estimating the SAT, so that, besides complexity of the processing, there are problems such as that the estimation time becomes long, and that traveling conditions, such as that the vehicle speed required for the estimation must be high, become severe.

The present invention has been developed in view of the above-described circumstances, and the object of the present invention is to provide a steering angle detecting apparatus for vehicles that obtains a wide range of angle information by performing vernier calculation by means of angle information from an angle sensor provided for a steering shaft and angle information from a rotation angle sensor of a motor, and detects a steering angle the neutral point of which has been specified in a short time by relatively simple structure and processing, and an electric power steering apparatus equipped therewith.

Means for Solving the Problems

The present invention relates to a steering angle detecting apparatus for vehicles, the above-described object of the present invention is achieved by that comprising: a vernier calculating section that performs vernier calculation based on a steering shaft angle As and a motor angle Am; a neutral period specifying section that specifies a neutral period including a neutral point based on a reference angle Av calculated by the vernier calculation in said vernier calculating section; and a neutral point specifying section that specifies said neutral point from said neutral period and a stored neutral point value, and outputs a steering angle Sag said neutral point of which is specified.

The above-described object of the present invention is more effectively achieved by that wherein an estimated or measured SAT value is used for specification of said neutral period in said neutral period specifying section; or wherein said neutral point value has been stored in an EEPROM; or said steering shaft angle As is an angle at a steering wheel side or a pinion side of a steering shaft, and said motor angle Am is outputted by a rotation angle sensor connected to a motor; or wherein said neutral point specifying section specifies said neutral point from said neutral period based on said neutral point value.

Further, the present invention relates to an electric power steering apparatus, the above-described object of the present invention is achieved by that which is equipped with the steering angle detecting apparatus for vehicles described in any one of the above, and performs steering assist control based on said steering angle Sag detected by the steering angle detecting apparatus for vehicles; or which supervises an output mutually by comparing said steering angle Sag with an angle signal outputted by another existing steering angle sensor, and can detect abnormality or failure immediately by said comparison when said abnormality or said failure occurs.

Effects of the Invention

The steering angle detecting apparatus for vehicles of the present invention can detect a wider range of the steering shaft angle because of performing the vernier calculation by means of the angle signal from the steering shaft angle sensor (the torque sensor) provided for the steering shaft and the angle signal from the rotation angle sensor (the resolver or the like) connected to the motor. The apparatus can detect (or estimate) the steering angle more simply and in a shorter time than before. The apparatus can detect (or estimate) the steering angle the neutral point of which has been specified because of specifying the neutral period including the neutral point of the steering angle from the reference angle extended by the vernier calculation and specifying the neutral point on the basis of the stored neutral point value.

Equipping the electric power steering apparatus with the steering angle detecting apparatus for vehicles of the present invention enables the steering assist control on the basis of the steering angle the neutral point of which has been specified.

MODE FOR CARRYING OUT THE INVENTION

An electric power steering apparatus (EPS) has been conventionally equipped with a special steering angle sensor in order to detect a steering wheel angle. Recently, however, there is the case where the EPS is equipped with an angle sensor that can be also made function as a torque sensor by requests such as improvement of reliability, redundancy of functions, and cost reduction. In this case, the EPS is equipped with an angle sensor, for example, whose period for a steering shaft is 40 degrees or 20 degrees in order to obtain high resolution required as a torque sensor. The present invention performs vernier calculation by angle information of the steering shaft detected in such periods as 40 degrees and 20 degrees and angle information from a rotation angle sensor (for example, a resolver) of a motor connected to the steering shaft through a reduction mechanism (reduction gears), obtains angle information (a reference angle) in a wider range than 40 degrees and 20 degrees (for example, a period of 240 degrees), and detects an steering angle in a short time by simpler structure and processing than before.

Specifically, the present invention extends an angle signal from the steering shaft angle sensor (the torque sensor) and an angle signal from the rotation angle sensor (the resolver) by vernier calculation, and specifies a neutral period that may probably include a neutral point of the steering angle from the extended reference angle. It is possible to estimate a period, for example, including a point where "a SAT value≈0 while running", which is characteristic of the neutral point, to be a neutral period including the neutral point because the extended reference angle enables detection of sufficiently wide range of the steering wheel angle. This can be judged immediately if a vehicle is running, and can be completed in a short time by very simple processing. Further, it is possible to specify the neutral point at the same time when specifying the neutral period including the neutral point by storing an answer to the question of where an actual neutral point exists in the neutral period including the neutral point in such a storing section as an EEPROM in advance.

Hereinafter, an embodiment of the present invention will be described in detail with reference to the accompanying drawings.

Figure 1:
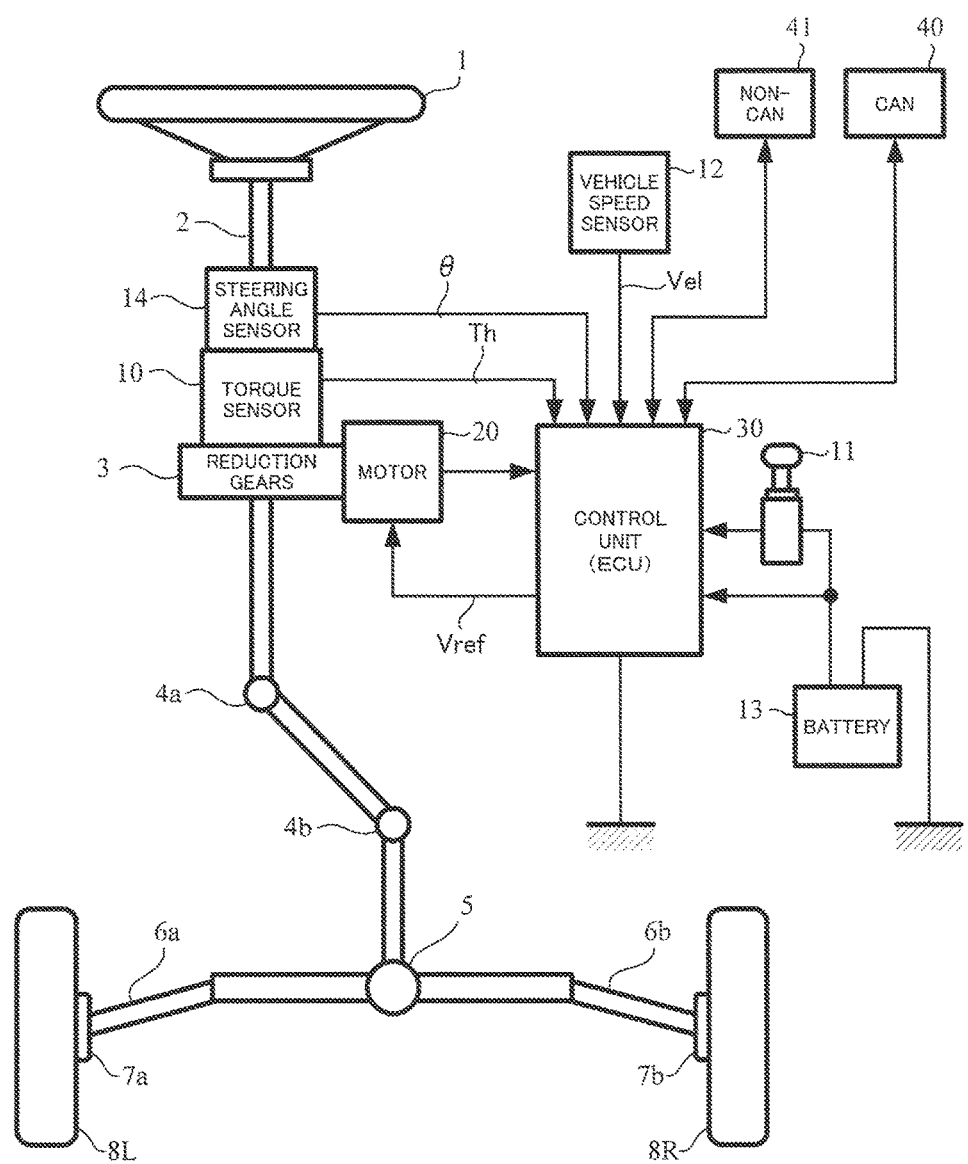
FIG. 1 is a configuration diagram illustrating a general outline of an electric power steering apparatus.
Figure 2:
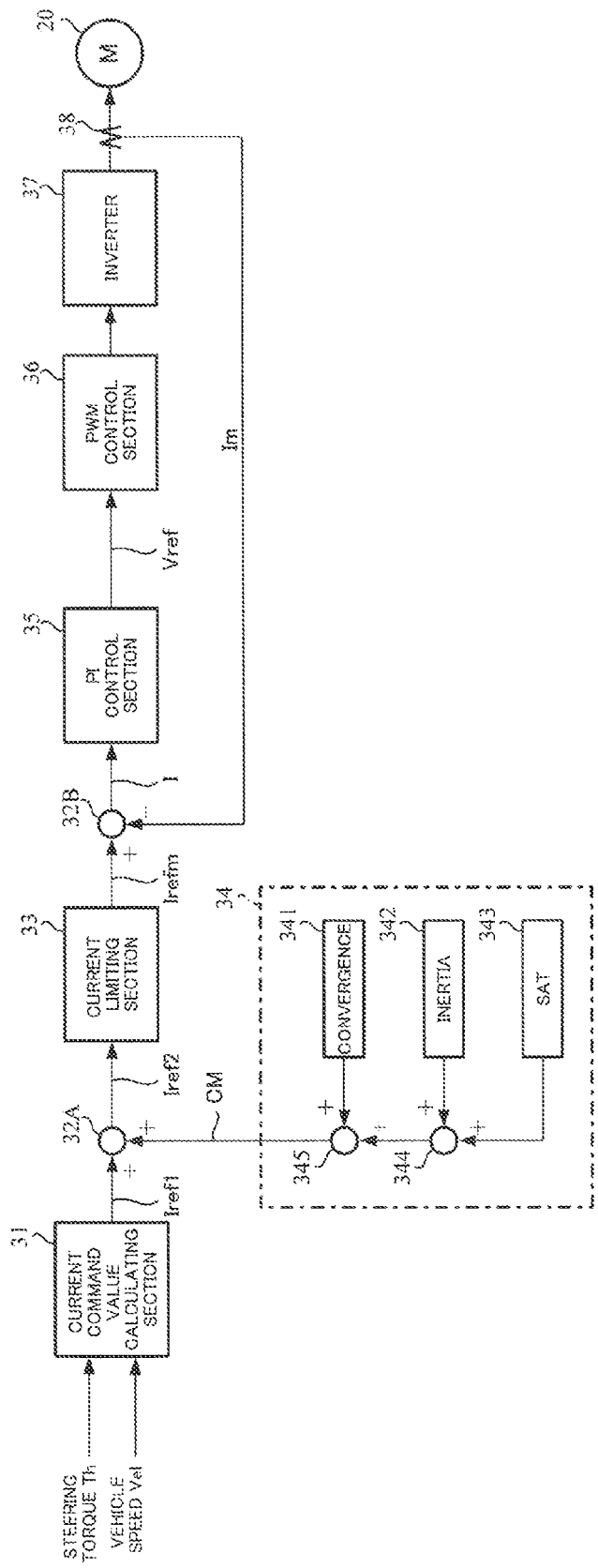
FIG. 2 is a block diagram showing a configuration example of a control system of the electric power steering apparatus.
Figure 3:
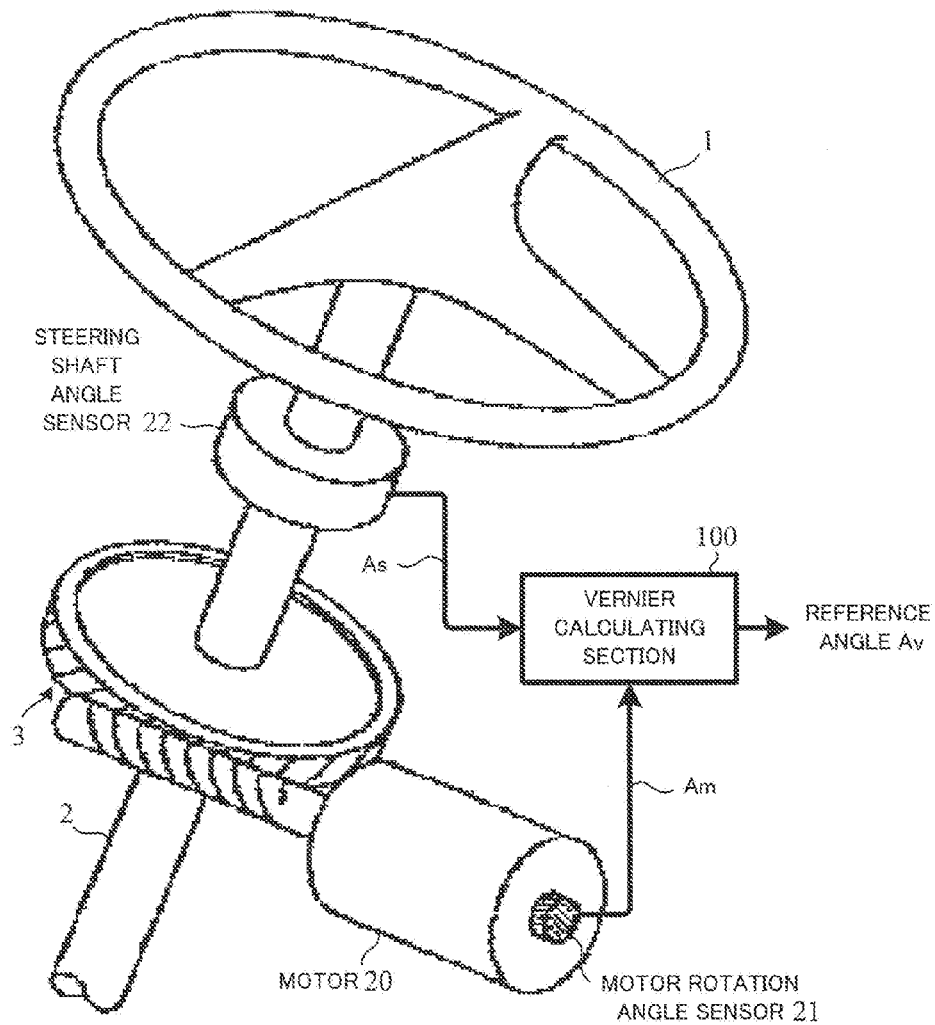
FIG. 3 is a block diagram showing a whole configuration of the present invention.

FIG. 3 shows a whole configuration of the present invention. A steering shaft angle sensor (a torque sensor) 22 is provided for a steering shaft 2 connected to a steering wheel 1, and a motor rotation angle sensor (a resolver) 21 is provided for a motor 20 provided for the steering shaft 2 through reduction gears 3. The steering shaft angle sensor 22 is provided on the steering wheel 1 side of the steering shaft 2 in FIG. 3, but may be provided on a pinion side. A motor angle Am detected by the motor rotation angle sensor 21 and a steering shaft angle As detected by the steering shaft angle sensor 22 are inputted into a vernier calculating section 100. The vernier calculating section 100 calculates a wide range (for example, a period of 240 degrees) of a reference angle Av on the basis of the motor angle Am and the steering shaft angle As.

Figure 4:
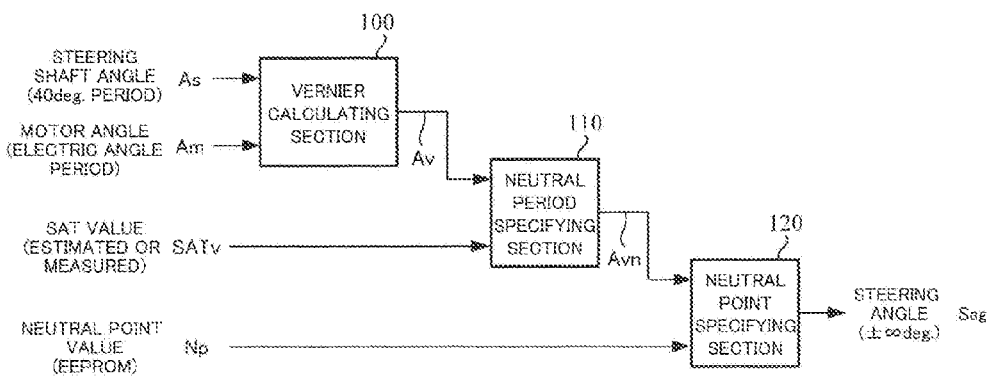
FIG. 4 is a block diagram showing a configuration example for calculation processing of the present invention.

FIG. 4 shows a configuration example for calculation processing performed to detect a steering angle. The steering shaft angle As (whose period is, for example, 40 degrees) and the motor angle Am (whose period is a period of an electric angle) are inputted into the vernier calculating section 100, and the calculated reference angle Av is inputted into a neutral period specifying section 110. An estimated or measured SAT value SATv has been inputted into the neutral period specifying section 110. Further, an angle signal Avn whose neutral period including a neutral point is specified in the neutral period specifying section 110 is inputted into a neutral point specifying section 120 with a neutral point value Np stored in a storing section (for example, an EEPROM). The neutral point specifying section 120 outputs a steering angle Sag (±∞ degrees) including the specified neutral point.

Figure 5:
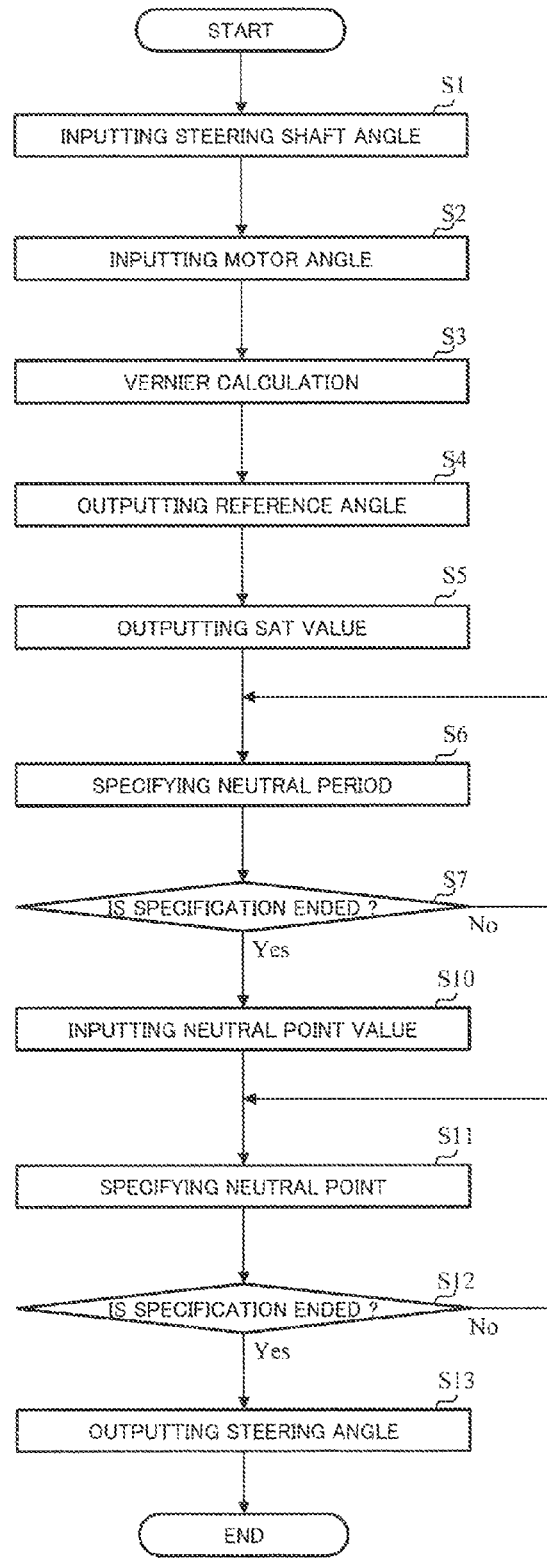
FIG. 5 is a flowchart showing an operating example of the calculation processing of the present invention.

An operation example of such a configuration will be described with reference to a flowchart shown in FIG. 5.

The present example will be described on the assumption that a reduction ratio of the motor is "18.5" and the number of pole pairs in the motor is "3". Combinations other than this are possible, for example, the reduction ratio of the motor is "16", "20.5", "20.333 . . . " (=61÷3) or the like, and the number of pole pairs in the motor is "2", "4", "5" or the like. A range of the reference angle Av obtained after the vernier calculation is determined by the combination of the reduction ratio of the motor and the number of pole pairs in the motor. Further, it is assumed that a period of the steering shaft angle As obtained from the steering shaft angle sensor 22 is 40 degrees, and a period of the motor angle Am obtained from the rotation angle sensor 21 provided for the motor 20 is 360 degrees in terms of an electric angle signal. These periods (the period of 40 degrees and the period of 360 degrees) are also an example, so that it is possible to use relations among other period signals.

The vernier calculating section 100 inputs the steering shaft angle As first (Step S1), and inputs the motor angle Am (Step S2). It is possible to reverse the order of these inputs. The vernier calculating section 100 performs the vernier calculation on the basis of the steering shaft angle As and the motor angle Am (Step S3).

A purpose of the vernier calculation is to calculate the reference angle Av that is an angle signal whose period is longer than both the steering shaft angle As and the motor angle Am by using them. In the procedure of the vernier calculation, the first is to set the following values as values specific to the system in advance.

(1) The maximum value of the motor angle Am is integrated with the unit of the steering shaft angle As, and the result is Am'm. That is, the maximum value Am'm=360÷3÷18.5≈6.486 . . . .
(2) Further, the maximum value of the steering shaft angle As is Asm (=40).
(3) Next, the least common multiple of the maximum value Am'm and the maximum value Asm is Al, so that the least common multiple Al=LCM(Am'm, Asm)=240.
(4) The result of dividing the least common multiple Al by the maximum value Asm is Ac, so that the division result Ac=Al÷Asm=6.
(5) Moreover, the result of dividing the maximum value Am'm by the division result Ac is Ap, so that the division result Ap=Am'm÷Ac=1.081 . . . .

Consequently, the maximum value Am'm of the motor angle Am, the maximum value Asm of the steering shaft angle As, the least common multiple Al, the division result Ac for the least common multiple Al, and the division result Ap for the maximum value Am'm are determined as the values specific to the system.

The next is to determine an index value Ai by performing the following calculations (a)~(d) by the values specific to the system determined as the above.

(a) The motor angle Am is integrated with the unit of the steering shaft angle As, and the result is Am'. That is, the motor angle Am'=Am÷3÷18.5.
(b) The remainder obtained by dividing the steering shaft angle As by the maximum value Am'm is As'. That is, the remainder value As'=mod(As, Am'm).
(c) The remainder obtained by dividing the addition value of the difference between the motor angle Am' and the remainder value As' and the result of "Ap÷2" by the maximum value Am'm is Ad. That is, the remainder value Ad=mod(Am'−As'+Ap÷2, Am'm).
(d) The value obtained by rounding the result of dividing the remainder value Ad by the division result Ap down to the decimal point is an index value Ai. That is, the index value Ai=INT(Ad÷Ap).

The vernier calculating section 100 performs calculation of the following Expression 1 by using the index value Ai determined as the above, the steering shaft angle As and the maximum value Asm, determines the reference angle Av that is the extended angle signal, and outputs the reference angle Av (Step S4)

$$Av = As + Asm \times Ai \qquad \text{[Expression 1]}$$

Figure 6:
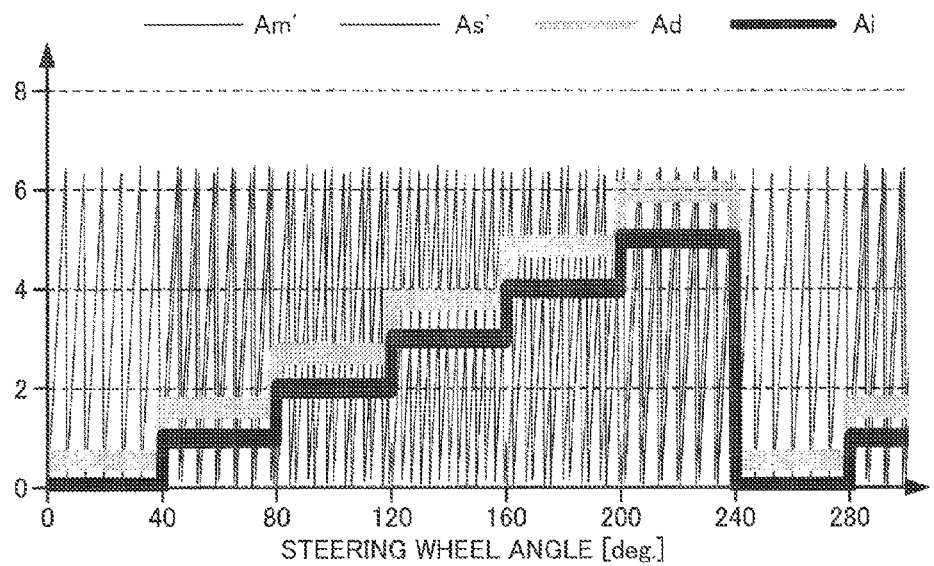
FIG. 6 is a waveform diagram for describing vernier calculation.
Figure 7:
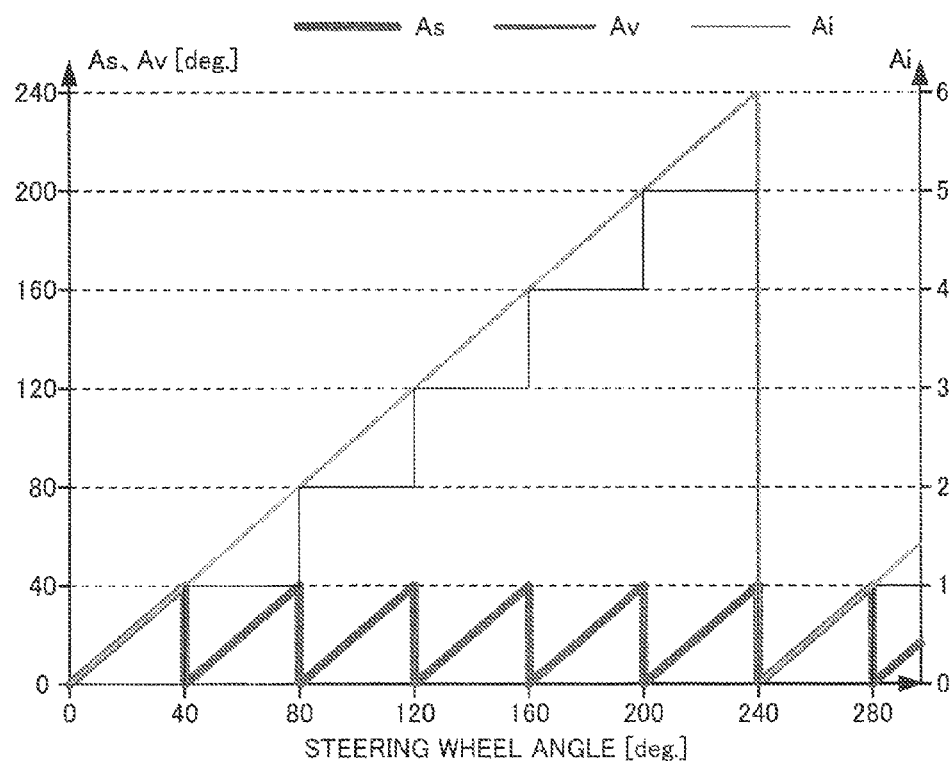
FIG. 7 is a waveform diagram for describing the vernier calculation.

Relations of the motor angle Am', the remainder value As', the remainder value Ad, and the index value Ai to the steering wheel angle are, for example, as shown in FIG. 6. Further, relations of the steering shaft angle As, the reference angle Av, and the index value Ai to the steering wheel angle are, for example, as shown in FIG. 7.

Figure 8:
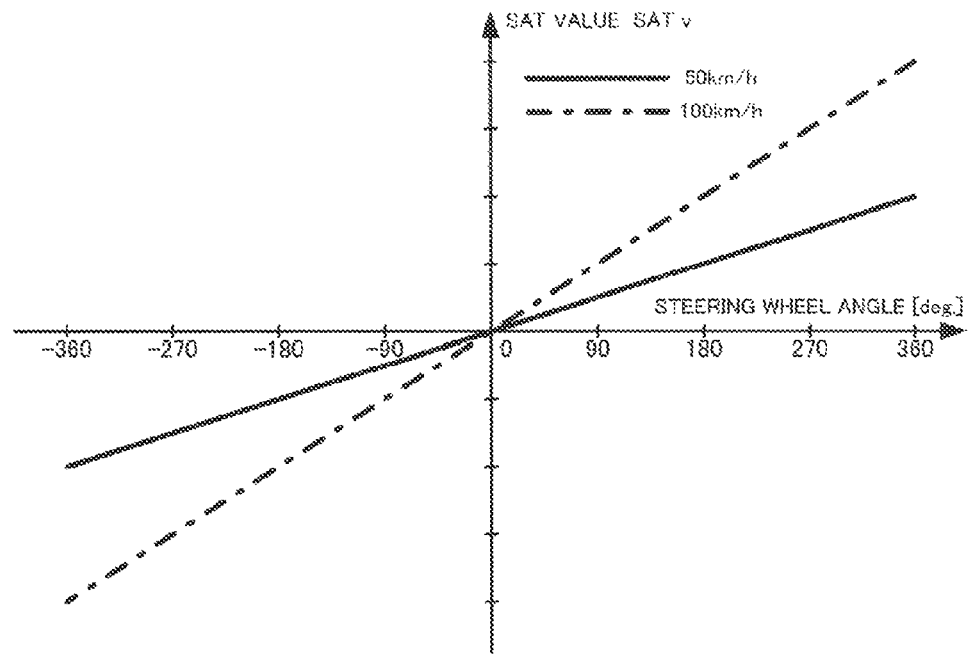
FIG. 8 is a characteristic diagram showing an example of relation between a steering shaft angle and a SAT.

The reference angle Av is inputted into the neutral period specifying section 110, and the estimated or measured SAT value SATv is also inputted into the neutral period specifying section 110 (Step S5). The neutral period specifying section 110 specifies the neutral period of the reference angle Av on the basis of the SAT value SATv (Step S6). The specification of the neutral point is continued until the specification is ended (Step S7). An example of a relation between the steering wheel angle and the SAT value SATv is shown in FIG. 8. FIG. 8 shows examples of 50 km/h and 100 km/h because the inclination changes depending on a vehicle speed. As seen from FIG. 8, the SAT value SATv indicates about 0 when the steering wheel angle is 0 degree. Therefore, it is possible to treat the steering wheel angle where the SAT value SATv indicates 0 as a neutral point. The SAT value SATv may be estimated by a known method, or be measured directly.

Figure 9:
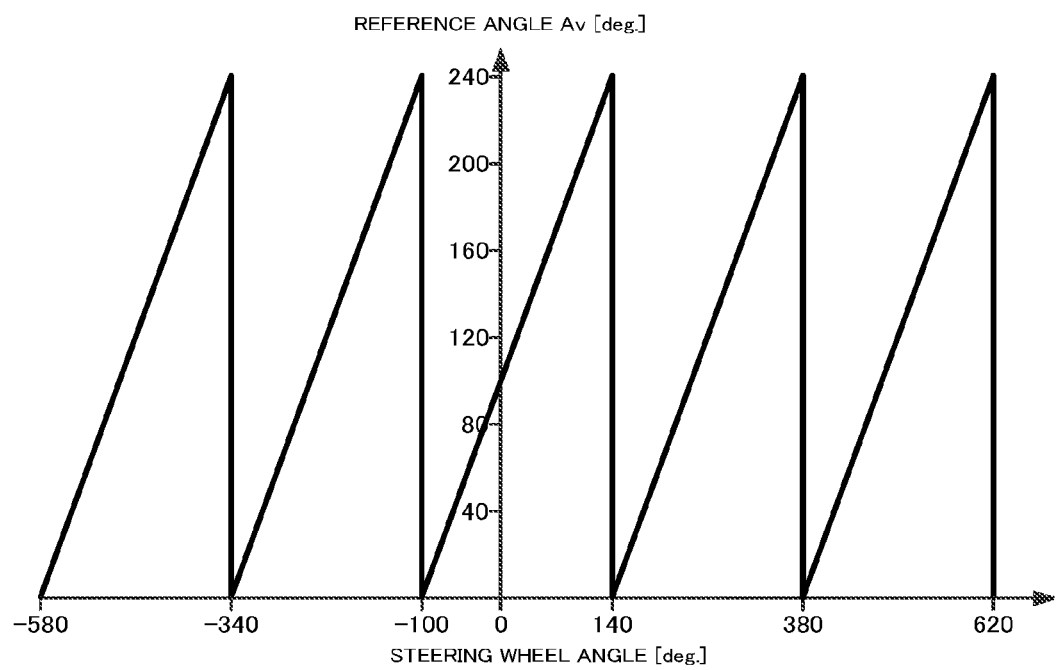
FIG. 9 is a characteristic diagram showing an example of relation between the steering shaft angle and a reference angle.

Assuming that the above reference angle Av obtained by the vernier calculation in the period of 240 degrees is positioned between −100 degrees and +140 degrees of the steering wheel angle, the relation between the steering wheel angle and the reference angle Av is as shown in FIG. 9. The steering wheel can be steered only to right and left rack ends, and the steering wheel angle varies within its range, so that the reference angle Av varies in the period of 240 degrees within its range as shown in FIG. 9. For example, when the steering wheel angle varies within 1200 degrees, the reference angle Av varies within 5 periods (=1200/240). In this case, the SAT value SATv does not indicate 0, as seen from FIG. 8, when the steering wheel angle is between −340 and −100 degrees, so that it is possible to judge that the neutral point is not in this range. Similarly, when the steering wheel angle is between 140 and 380 degrees, it is also possible to judge that the neutral point is not in this range. On the other hand, the SAT value SATv can indicate 0 or near 0 when the steering wheel angle is between −100 and 140 degrees, so that, at this moment, it is possible to judge that the neutral point is in this range of the steering wheel. These show that it is possible to easily detect the period including the neutral point of the steering wheel in all periods of the reference angle Av that periodically changes between 0 and 240 degrees in a wide range of the steering wheel angle.

When the specification of the neutral period is ended as the above (Step S7), the reference angle Av in the specified neutral period including the neutral point is inputted as the angle signal Avn into the neutral point specifying section 120. The neutral point specifying section 120 inputs the neutral point value Np read from the storing section (for example, an EEPROM) in an ECU or the like (Step S10). The storing section has stored the value of the reference angle Av at the neutral point of the steering wheel as the neutral point value Np in advance. For example, in the case of FIG. 9, the storing section has stored the value of 100 degrees as the neutral point value Np, and the neutral point specifying section 120 can specifies the steering wheel angle where the angel signal Avn indicates 100 degrees in the previously determined period of the angle signal Avn including the neutral point as the neutral point (Step S11). This enables the specification of the neutral point in a shorter time because it is possible to omit the processing the needs the most time and requires high estimation accuracy.

After the neutral point specifying section 120 specifies the neutral point on the basis of the neutral point value Np (Step S12), it outputs the steering angle Sag (Step S13). An electric power steering apparatus performs steering assist control on the basis of the steering angle Sag.

That is, the electric power steering apparatus is equipped with the above steering angle detecting apparatus for vehicles, and performs the steering assist control on the basis of the steering angle Sag detected by the steering angle detecting apparatus for vehicles. Further, it is possible to supervise mutual outputs by comparing the steering angel Sag with an angle signal outputted from another existing steering angle sensor. When abnormality or failure occurs, comparing the steering angle Sag and the angle signal from the other steering angle sensor enables immediate detection of the abnormality or the failure.

EXPLANATION OF REFERENCE NUMERALS

1 steering wheel
2 steering shaft (column shaft, handle shaft)
10 torque sensor
12 vehicle speed sensor
13 battery
20 motor
21 motor rotation angle sensor (resolver)
22 steering shaft angle sensor (torque sensor)
30 control unit (ECU)
31 current command value calculating section
33 current limiting section
34 compensating section
35 PI control section
36 PWM control section
37 inverter circuit
40 CAN
41 non-CAN
100 vernier calculating section
110 neutral period specifying section
120 neutral point specifying section

The invention claimed is:

1. An electric power steering apparatus equipped with a steering angle detecting apparatus for vehicles, the steering angle detecting apparatus comprising:
 a vernier calculating section that performs vernier calculation based on a steering shaft angle As detected by a steering shaft angle sensor and a motor angle Am detected by a motor rotation angle sensor;
 a neutral period specifying section that specifies a neutral period including a neutral point based on a reference angle Av calculated by the vernier calculation in said vernier calculating section; and
 a neutral point specifying section that specifies said neutral point from said neutral period and a neutral point value stored in a storing section, and outputs a steering angle Sag, said neutral point of which is specified,
 wherein the electric power steering apparatus performs steering assist control based on said steering angle Sag detected by the steering angle detecting apparatus for vehicles.

2. The steering angle detecting apparatus for vehicles according to claim 1, wherein an estimated or measured Self-Aligning Torque (SAT) value is used for specification of said neutral period in said neutral period specifying section.

3. The steering angle detecting apparatus for vehicles according to claim 1, wherein said neutral point value has been stored in an Electronically Erasable Programmable Read-Only Memory (EEPROM).

4. The steering angle detecting apparatus for vehicles according to claim 2, wherein said neutral point value has been stored in an Electronically Erasable Programmable Read-Only Memory (EEPROM).

5. The steering angle detecting apparatus for vehicles according to claim 1, wherein said steering shaft angle As is an angle at a steering wheel side or a pinion side of a steering shaft.

6. The steering angle detecting apparatus for vehicles according to claim 2, wherein said steering shaft angle As is an angle at a steering wheel side or a pinion side of a steering shaft.

7. The steering angle detecting apparatus for vehicles according to claim 1, wherein said neutral point specifying section specifies said neutral point from said neutral period based on said neutral point value.

8. The steering angle detecting apparatus for vehicles according to claim 2, wherein said neutral point specifying section specifies said neutral point from said neutral period based on said neutral point value.

9. The steering angle detecting apparatus for vehicles according to claim 5, wherein said neutral point specifying section specifies said neutral point from said neutral period based on said neutral point value.

10. The electric power steering apparatus equipped with the steering angle detecting apparatus for vehicles according to claim 1, which supervises an output mutually by comparing said steering angle Sag with an angle signal outputted by another existing steering angle sensor, and can detect abnormality or failure immediately by said comparison when said abnormality or said failure occurs.

11. The electric power steering apparatus equipped with the steering angle detecting apparatus for vehicles according to claim 2, which supervises an output mutually by comparing said steering angle Sag with an angle signal outputted by another existing steering angle sensor, and can detect abnormality or failure immediately by said comparison when said abnormality or said failure occurs.

12. The electric power steering apparatus equipped with the steering angle detecting apparatus for vehicles according to claim 5, which supervises an output mutually by comparing said steering angle Sag with an angle signal outputted by another existing steering angle sensor, and can detect abnormality or failure immediately by said comparison when said abnormality or said failure occurs.

13. The electric power steering apparatus equipped with the steering angle detecting apparatus for vehicles according to claim 7, which supervises an output mutually by comparing said steering angle Sag with an angle signal outputted by another existing steering angle sensor, and can detect abnormality or failure immediately by said comparison when said abnormality or said failure occurs.

\* \* \* \* \*